Patented Oct. 24, 1933

1,931,529

UNITED STATES PATENT OFFICE 1,931,529

PROCESS FOR PRODUCING WHITE LUMINOUS TUBES OF ELECTRIFIED NEON GAS

Rodolph de Lamprecht, Vancouver, British Columbia, Canada, assignor to The Cold White Light Inc., Seattle, Wash., a corporation of Washington No Drawing. Application June 16, 1931
Serial No. 544,932

1 Claim. (Cl. 176—125)

This invention relates to a process for producing white luminous tubes of electrified neon gas.

Electrified neon gas as used in tubes for signs and various methods of advertising has recently come into greatly extended use on account of its low cost of upkeep, and the intrinsic value of its arresting power because of its vivid colour.

But its limitations have been very obvious and one of the greatest has been the inability to obtain by its use a luminous white light. This defect is eliminated by my invention which, by the aid of a simply performed—but somewhat obstruse chemical reaction and following reactions—enables the well known scarlet colour of neon gas under suitable electrification to be rapidly bleached or changed, to give a distinctive white luminous appearance.

The process which I have discovered to produce this decolorizing or bleaching effect upon the neon gas as ordinarily used in tubes to obtain a continuous luminosity, usually scarlet—but modified by various methods, chiefly empirical, to vary the colour effect—may be broadly stated to consist in the addition to the neon gas of a decolorizing gas at such a pressure as will not appreciably interfere with the pressure at which the neon gas has been found to most efficiently work.

The decolorizing gas is produced by adding sulphuric acid by comparatively small regular increments to zinc oxide, thus forming zinc sulphate and water. The zinc sulphate, owing to the rising temperature, is decomposed into zinc oxide, sulphurous anhydride and oxygen.

These partially recombine and form with the moisture sulphuric acid which falls on the zinc oxide again. As the temperature still continues to rise the zinc oxide vaporizes and is carried with a portion of the dry sulphurous anhydride and oxygen into the neon gas which is decolored thereby.

These chemical reactions are separate, simultaneous and continuous and may give rise to further more involved reactions. They may be symbolically stated as follows:

(1) $ZnO + H_2SO_4 = ZnSO_4 + H_2O$
(2) $ZnSO_4 + Heat = ZnO + SO_2 + O$
(3) $ZnO + SO_2 + O + H_2O = H_2SO_4 + ZnO$ The gaseous reaction products are added to tubes containing neon and the tubes sealed.

Having now particularly described my invention, what I claim and desire to be protected in by Letters Patent, is:

A process for producing a white luminous effect in tubes comprising filling said tubes with neon gas and an addition of a decolorizing gas produced by adding in small regular increments sulphuric acid to zinc oxide, sealing said tubes, and electrically energizing the tubes.

RODOLPH DE LAMPRECHT.